(12) United States Patent
He et al.

(10) Patent No.: US 9,626,673 B2
(45) Date of Patent: Apr. 18, 2017

(54) FINANCIAL TRANSACTION BASED ON DEVICE-TO-DEVICE COMMUNICATIONS

(71) Applicant: Shenzhen Huiding Technology Co., Ltd., Shenzhen (CN)

(72) Inventors: Yi He, San Diego, CA (US); Bo Pi, Carlsbad, CA (US)

(73) Assignee: Shenzhen Huiding Technology Co., Ltd., Shenzhen (CN)

( * ) Notice: Subject to any disclaimer, the term of this patent is extended or adjusted under 35 U.S.C. 154(b) by 0 days.

(21) Appl. No.: 14/663,354

(22) Filed: Mar. 19, 2015

(65) Prior Publication Data
US 2015/0269563 A1    Sep. 24, 2015

Related U.S. Application Data

(60) Provisional application No. 61/955,586, filed on Mar. 19, 2014.

(51) Int. Cl.
*G06K 5/00* (2006.01)
*G06Q 20/34* (2012.01)
(Continued)

(52) U.S. Cl.
CPC ......... *G06Q 20/352* (2013.01); *G06Q 20/223* (2013.01); *G06Q 20/24* (2013.01);
(Continued)

(58) Field of Classification Search
CPC ... G07F 19/20; G07F 7/1008; G06Q 10/1085; G06Q 20/341; G06K 7/084; G06K 7/087; G06K 17/00; G06K 7/10693
(Continued)

(56) References Cited

U.S. PATENT DOCUMENTS

| | | | |
|---|---|---|---|
| 7,472,825 B2 * | 1/2009 | Fitch | G07G 1/0018 |
| | | | 235/379 |
| 8,438,073 B2 | 5/2013 | White | |
| (Continued) | | | |

FOREIGN PATENT DOCUMENTS

WO    2014/102618 A2    7/2014

OTHER PUBLICATIONS

International Search Report and Written Opinion mailed on Aug. 7, 2015 for International Application No. PCT/US2015/021603, filed on Mar. 19, 2015 (10 pages).

*Primary Examiner* — Karl D Frech
(74) *Attorney, Agent, or Firm* — Perkins Coie LLP

(57) ABSTRACT

The systems, devices and techniques disclosed provide a credit card type device which is integrated with active electronics to perform credit card type financial transactions. In one aspect, a credit card type device includes a device-to-device communication port to wirelessly communicate with another device in an attempt to complete a financial transaction. The credit card type device includes an authentication mechanism to authenticate access to the credit card type device for the initiated financial transaction. The credit card type device includes controller circuitry to control operations of the device-to-device communication port and the authentication mechanism. The credit card type device includes an output device to display information associated with the access authentication and the financial transaction.

22 Claims, 10 Drawing Sheets

(51) Int. Cl.
*G06Q 20/40* (2012.01)
*G06Q 20/24* (2012.01)
*G06Q 20/22* (2012.01)
*G06Q 20/32* (2012.01)
G06K 19/077 (2006.01)
G06K 19/07 (2006.01)
G06K 17/00 (2006.01)

(52) U.S. Cl.
CPC ....... *G06Q 20/322* (2013.01); *G06Q 20/3278* (2013.01); *G06Q 20/341* (2013.01); *G06Q 20/342* (2013.01); *G06Q 20/3415* (2013.01); *G06Q 20/353* (2013.01); *G06Q 20/409* (2013.01); *G06K 19/0702* (2013.01); *G06K 19/0718* (2013.01); *G06K 19/07707* (2013.01); *G06K 19/07709* (2013.01); *G06K 19/07749* (2013.01); *G06K 2017/0067* (2013.01)

(58) Field of Classification Search
USPC ................. 235/380, 379, 449, 462.13; 902/3
See application file for complete search history.

(56) References Cited

U.S. PATENT DOCUMENTS

| | | |
|---|---|---|
| 8,511,543 B2 | 8/2013 | Yankovich et al. |
| 8,544,730 B2 | 10/2013 | Ma et al. |
| 2004/0029569 A1 | 2/2004 | Khan et al. |
| 2008/0301020 A1 | 12/2008 | Varakantam |
| 2010/0036524 A1 | 2/2010 | Chirco |
| 2010/0312704 A1 | 12/2010 | Rohatgi |
| 2011/0272478 A1 | 11/2011 | Mullen |
| 2013/0054454 A1 | 2/2013 | Purves et al. |
| 2013/0127791 A1 | 5/2013 | Siuta |
| 2015/0149310 A1 | 5/2015 | He et al. |

\* cited by examiner

FINANCIAL TRANSACTION BASED ON DEVICE-TO-DEVICE COMMUNICATIONS

CROSS REFERENCE TO RELATED APPLICATIONS

This patent document claims the benefit of priority of U.S. Provisional Patent Application No. 61/955,586, filed on Mar. 19, 2014. The entire content of the before-mentioned patent application is incorporated by reference as part of the disclosure of this document.

TECHNICAL FIELD

This patent document relates to techniques, devices and systems for exchanging financial information between two or more communication devices via device-to-device communications.

BACKGROUND

Various financial transactions can be carried out through credit card systems. Each credit card and the associated cards are issued by a financial institution. However, credit card security relies on the physical security of the card, as well as the privacy of the credit card information (such as the card number and the expiration date). When a credit card is lost or stolen, or when the credit card information is stolen, a person other than the card owner having access to the physical card or the credit card information can easily place fraudulent charges on the lost, stolen, or compromised credit card.

SUMMARY

The systems, devices and techniques disclosed in this document provide a credit card type device which is integrated with active electronics (and optionally having a battery) to perform credit card type financial transactions. In one aspect, the credit card type device includes both owner authentication functions and a device to device communication mechanism such as a capacitive-coupling communication port or a radio frequency (RF) near-field communication (NFC) port. The owner authentication functions allow the card owner to authenticate the card access and to authorize transactions, while the capacitive coupling/NFC mechanism allows the card to securely communicate with a transaction terminal to exchange financial information through device-to-device communication. The credit card type device may also include a controller circuit for controlling the operations of the NFC port and the user authentication, and a display for indicating the results of user authentication and financial transactions. The credit card type device can also communicate with a mobile device such as a smartphone to check the status of the card, or to update the balance on the card authorized by the owner of the card.

In one aspect, a credit card type device includes a device-to-device communication port to wirelessly communicate with another device in an attempt to complete a financial transaction. The credit card type device includes an authentication mechanism to authenticate access to the credit card type device for the initiated financial transaction. The credit card type device includes controller circuitry to control operations of the device-to-device communication port and the authentication mechanism. The credit card type device includes an output device to display information associated with the access authentication and the financial transaction.

The credit card type device can be implemented to include one or more of the following features. The device-to-device communication port can include a capacitive-coupling port or a radio frequency (RF)-coupling near-field communication (NFC) port. The authentication mechanism can include a passcode authentication mechanism, a fingerprint detection mechanism, or both a passcode authentication mechanism and a fingerprint detection mechanism. The passcode authentication mechanism can include buttons or a keypad. The fingerprint detection mechanism can include a fingerprint scanner. The control circuitry can include a processor and a memory. The credit card type device can communicate with a host device to receive information to configure the credit card device. The credit card type device can be configured as a gift card associated with a particular business and having a predetermined value. The output device is configured to display a logo of the particular business. The credit card type device can be configured to temporarily associate with the particular business until the predetermined value reaches zero or until an expiration date is reached. The credit card type device can be reusable as a generic gift card when the temporary association with the particular business ends. The gift card can include a reset function to erase the predetermined value and to disassociate with the particular business to operate a generic gift card applicable for multiple businesses. When operating as the generic gift card, the credit card type device can be reprogrammed with a new value associated with a new expiration date. The reprogrammed new value of the generic gift card is refundable to an owner of the generic gift card after the new expiration date is reached. The credit card type device of claim can include a battery. The credit card type device of claim can be implemented on a smartphone equipped with a capacitive touch screen.

In another aspect, a method for performing device-to-device communication includes establishing a device-to-device wireless communication channel, from a device equipped with a device-to-device communication port, with another device. The method includes receiving, by the device using the established device-to-device wireless communication channel, information associated with initiating a financial transaction from the other device. The method includes authenticating, by an authenticating mechanism of the device, access to the device during the financial transaction. The method includes responsive to authenticating the access to the device, transmitting through the device-to-device communication channel financial information to complete the financial transaction.

The method can be implemented in various ways to include one or more of the following features. The method can include receiving, by the device, confirmation of the financial transaction from the other device. Receiving information associated with initiating a financial transaction from the other device can include receiving a transaction amount. The financial data can include credit information of an owner of the device. Authenticating access to the device can include receiving a passcode through the authentication mechanism, detecting a fingerprint by the authentication mechanism, or both.

In another aspect, a financial transaction system includes the above-described credit card type device having active electronics (and optionally having a battery) as an end user device, a transaction terminal and optionally a backroom server. The transaction terminal can include a display component to display transaction amount and a NFC mechanism to allow a device-to-device communication between the credit card type device and the transaction terminal through the respective NFC mechanism.

For example, a financial transaction system can include a credit card type device, which includes: a first device-to-device communication port that provides a communication link between the credit card type device with another device to exchange information; an owner authentication mechanism that authenticates access to the credit card type device; and a controller circuit that controls operations of the first device-to-device communication port and the owner authentication mechanism. The financial transaction system can include a transaction terminal device, which includes: a second device to device communication port operable to communicate with the first device to device communication port; an user interface module to enter a transaction amount; and a wired or wireless communication port to connect the transaction terminal device to the Internet.

The financial transaction system can be implemented in various ways to include one or more of the following features. For example, each of the first and the second device to device communications ports can include a capacitive-coupling communication port. Each of the first and the second device to device communication ports can include an RF-coupling near-field communication (NFC) port. The owner authentication mechanism can include a passcode authentication mechanism or a fingerprint detection mechanism such as a fingerprint scanner. The a passcode authentication mechanism can include passcode entering buttons. The fingerprint detection mechanism can include a fingerprint scanner. The control circuit can include a processor a memory. The memory can include a secure portion for storing passcodes and fingerprint patterns of an owner of the credit card type device. The control circuit can further include an encryption engine for encrypting data stored in the memory and transmitted to the transaction terminal device. The credit card type device can further include a display for indicating the result of a financial transaction. The credit card type device can further include a battery to provide power to active electronics within the credit card type device. The credit card type device can include a size and an aspect ratio similar to a regular credit card. The credit card type device can be associated with a money balance, which can be increased, decreased, and erased. The transaction terminal can include a display for displaying one or more of: status of a financial transaction; and a transaction amount. The financial transaction system can include a wired or wireless communication channel connecting the transaction terminal device to a remote transaction server of a financial institution over the Internet. The credit card type device can be configurable using a smartphone of the owner of the credit card type device. The transaction terminal device can be implemented on a smartphone equipped with a capacitive touch screen.

In another aspect, a process for performing a secure financial transaction is disclosed. This process may include the steps of: (1) initiating a financial transaction request by a transaction terminal equipped with a first NFC port; (2) upon accepting the financial transaction request, authenticating a credit card type device equipped with a second NFC port; (3) upon a successful authentication, positioning the credit card type device to close proximity of the transaction terminal to establish a device-to-device communication channel between the first NFC port and the second NFC port; (4) exchanging financial data between the credit card type device and the transaction terminal through the device-to-device communication channel; (5) sending the financial data from the transaction terminal to a remote server of a financial institution; (6) verifying the financial data at the remote server; and (7) sending confirmation of the financial transaction from the remote server back to the transaction terminal.

In another aspect, a financial transaction system including both a credit card type device and a transaction terminal device is disclosed. The credit card type device further includes: a first near-field communication (NFC) port; an owner authentication mechanism; and a controller circuit for controlling the operations of the first NFC port and the owner authentication mechanism. The transaction terminal device further includes: a second NFC port operable to communicate with the first NFC port; means to enter a transaction amount; and a wired or wireless port to connect to the Internet.

Various features and implementations are described in greater detail in the drawings, the description and the claims.

DETAILED DESCRIPTION

Figure 1:
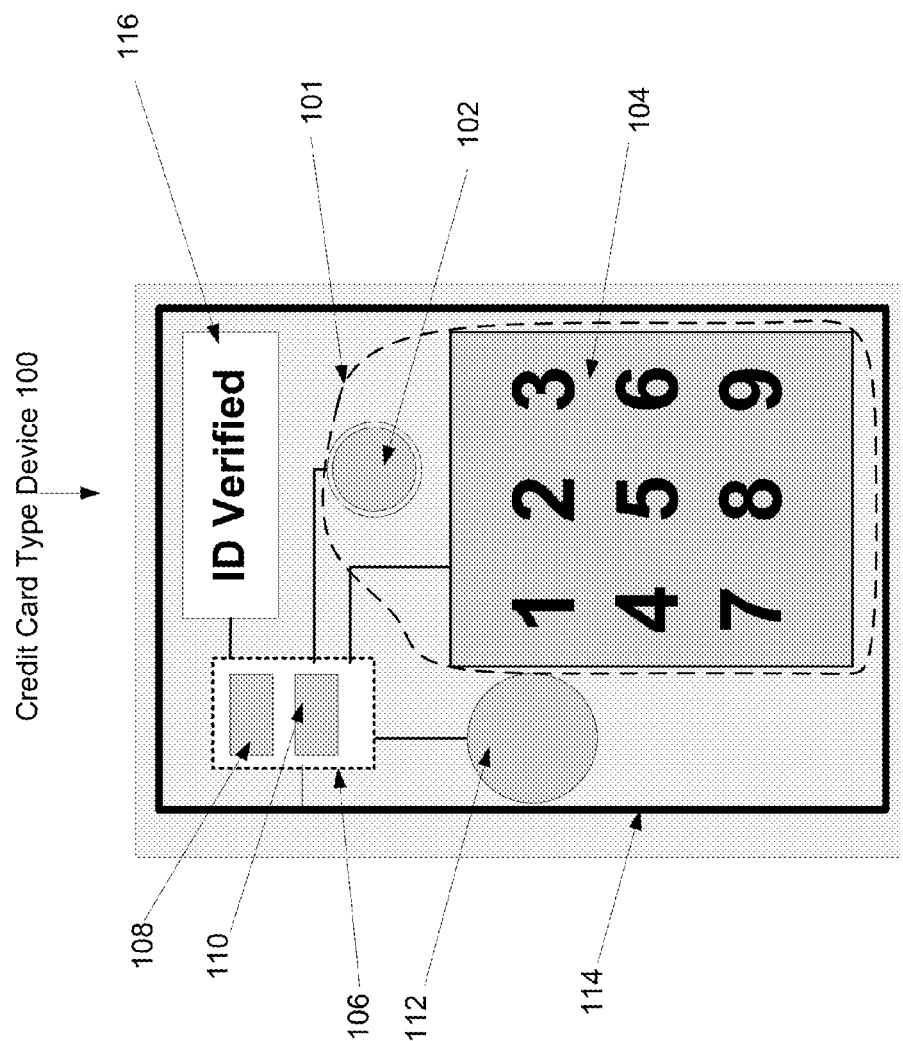
FIG. 1 shows an example of a credit card type device of a disclosed financial transaction system.

Embodiments of the present disclosure provide a financial transaction system including a credit card type device that can include active electronics to perform credit card type financial transactions. The credit card type device may be referred to hereinafter as "the card," "the card device," or "the device." The credit card type device can include one or more authentication mechanisms to authenticate access to the card and to authorize financial transactions. For example, the one or more authentication mechanisms can include a fingerprint detector for detecting and verifying a fingerprint input as belong to or associated with an authorized user of the credit card type device. The authentication mechanism can also include a passcode entry system such as a keypad with buttons for receiving a passcode input to authenticate access to the credit card type device. The authentication mechanism can include one or all of these different examples when authenticating the access to the credit card type device. The credit card type device also includes a wireless device-to-device communication port to wirelessly establish a device-to-device communication with another device, such as a transaction terminal device at a point of sale. Examples of the device-to-device communication port can include any one or available wireless communication ports including a near field communication (NFC) mechanism, which can be a standard radio frequency (RF) NFC device, or a capacitive-coupling communication function, such as a capacitive touch input device. The credit card type device can include other electronics or circuitry including a processor and a memory. In some embodiments, a portion of the memory is accessed through a security mechanism, wherein the data stored in the secure portion of the memory is encrypted. In some embodiments, the authentication and verification information (such as the passcode and the fingerprint patterns) are stored at this secure portion of the memory. The additional electronics or circuitry can also include an output device for such as a display, which can include a simple LED indicator or a LCD display. Such a display can be used to display the status of the device, such as the results of authentication (i.e., verified, retry or denied), status of the financial transactions, and information associated with the credit card device including current value of the credit card device, name of associated business, expiration date, etc. The card device can also include a battery to power the active electronics. In some implementations, the card can be a passive device that is powered by an active device, for example, when communication with a transaction terminal device to complete a transaction using NFC or RFID technologies.

The financial transaction system can include another device for the credit card type device to communicate with. For example, the other device can include a transaction terminal, which includes a display component to indicate the status of financial transactions, or to optionally display the transaction amount. The other device can be a smart phone with a transaction capability, or other similarly equipped devices in some implementations. The transaction terminal includes a device to device communication mechanism, which can be a standard RF NFC function, or a capacitive-coupling communication function. The transaction terminal can include a data input system or user interface module, such as a keypad with buttons or a touch screen for receiving user input including the transaction amount. The financial transaction system also includes a wired or wireless communication channel connecting the transaction terminal to the Internet to send and receive secure data between the transaction terminal and a remote service of a financial institution. The communication of the terminal to the internet may be secured by a encryption mechanism.

FIG. 1 shows an example of a credit card type device 100 for use in a financial transaction. As shown in FIG. 1, credit card type device 100 includes a authentication mechanism 101 for authenticating access to the credit card type device. The authentication mechanism 101 can include a fingerprint detector 102 for detecting a fingerprint input and verifying the detected fingerprint as belonging to or associated with an authorized user or owner of the credit card type device. The authentication mechanism 101 can also include a passcode pad 104 for receiving a passcode input. While both the fingerprint detector 102 and the passcode pad 104 are shown in FIG. 1, in some embodiments, a credit card type device may include only one of the available authentication mechanisms.

Control circuitry 106 can be coupled to the authentication mechanism 101, such as the fingerprint detector 102 and the passcode pad 104 to control operation of the authentication mechanism 101. The control circuitry 106 can include a processor 108 and a memory 110. The processor 108 can include any type of processor, including, but not limited to, a microprocessor, a digital signal processor, a device controller and a computational engine within an appliance. Furthermore, the processor 108 can include one or more cores. Processor 108 can include a cache that stores code and data for execution by the processor. The memory 110 can include any type of memory that can store code and data for execution by the processor 108. This includes but not limited to, dynamic random access memory (DRAM), static random access memory (SRAM), flash memory, and read only memory (ROM). In some embodiments, the memory 110 is non-volatile memory. In some embodiments, a portion of the memory 110 is accessed with a encrypted security restriction, so that the access to this part of the memory is only possible by the card owner through an authentication (e.g., using the corresponding decryption). In some embodiments, the authentication and verification information of the card owner (such as the passcode, and the fingerprint patterns) are stored at this secure portion of the memory.

In some implementations, the credit card type device 100 can include a local power source, such as a battery 112 which is generally coupled to all electronics of card device 100. Battery 112 can include all types of thin and flexible batteries, such as Lithium-based batteries. In some embodiments, a proposed credit card type device does not have a dedicated battery but obtains power externally. In some embodiments, instead of using battery 112, a proposed credit card type device receives power from solar cells integrated with the card device.

The card device 100 includes a device-to-device communication port 114. One example of the device-to-device communication port 114 is a capacitive-coupling device. When using capacitive coupling, the device-to-device communication port 114 can be configured as a capacitive transceiver that includes a transmitter (TX) for sending a signal via capacitive coupling to another device having a capacitive-coupling communication port, and a receiver (RX) that receives a signal via capacitive-coupling communication port 114 from the capacitive-coupling communication port of the other device. Examples of capacitive-coupling communications are described briefly below and are also described in a co-pending U.S. patent application Ser. No. 14/556,060 entitled "WEARABLE COMMUNICATION DEVICES FOR SECURED TRANSACTION AND COMMUNICATION" FILED Nov. 28, 2014, which is incorporated by reference as a part of this patent document.

Capacitive coupling device-to-device communications can include communicating via a human body of a user between (1) a capacitor sensor touch screen device that includes a capacitor sensor touch screen that includes capacitor sensors and provides a display function and (2) a capacitor sensor device that includes one or more capacitor sensors that detect or sense, based on capacitive sensing and without providing a display function, signals transmitted from the capacitor sensor touch screen of the capacitor sensor touch screen device. The human body of a user operates as a signal transmitting medium or channel between the capacitor sensor touch screen device and the capacitor sensor device without a display function to transmit signals between the two devices in communications.

In some implementations, capacitive coupling device-to-device communications can be implemented using direct device-to-device coupling between two capacitor sensor touch screen devices each including capacitor sensor touch screen that includes capacitor sensors and optionally a display function.

In one aspect a wearable device for capacitive coupled communications is described. The wearable device includes capacitive sensor transceiver circuitry configured to receive a capacitive coupled signal from a host device. The capacitive coupled signal is received through a body of a user of the wearable device and is modulated to include a request for authentication data to authenticate the wearable device with the host device. The wearable device includes processing circuitry in communication with the capacitive sensor transceiver circuitry to process the received capacitive coupled signal and transmit authentication data modulated on a capacitive coupled reply signal to the host device. The capacitive coupled reply signal modulated with the authentication data is transmitted through the body of the user of the wearable device. The capacitive sensor transceiver circuitry receives another capacitive coupled signal from the host device modulated with information indicating a successful authentication of the wearable device with the host device.

The wearable device can be implemented in various ways to include one or more of the following features. The capacitive sensor transceiver circuitry can communicate, using capacitive coupled signaling, with a point of sales (POS) terminal to process a transaction. The wearable device can include a display screen to present information to the user. The authentication data can include encrypted ID and password information. The wearable device can include a smartwatch worn on a wrist of the user. The wearable device can be attached to a belt worn by the user. The wearable device can be included in a shoe worn by the user. The wearable device can be included in an article which is attached to the user. The wearable device can include at least one other sensor configured to collect sensor data. The at least one other sensor can measure a biological parameter of the user. The biological parameter of the user can include a temperature of the user. The biological parameter of the user can include a blood pressure of the user. The biological parameter of the user can include a body pulse rate of the user. The at least one other sensor can measure a motion parameter of the user.

In another aspect, a method performed by a wearable device for capacitive coupled communications is described. The method includes detecting, by the wearable device, a signal sent from a host device through a user's body using a capacitive coupling channel. The received signal is modulated with a request to authenticate the wearable device with the host device. The method includes responsive to detecting the signal sent from the host device, transmitting, by the wearable device, a reply signal modulated with authentication data that includes encrypted ID and password information. The reply signal is transmitted through the user's body using capacitive coupling. The method includes receiving, by the wearable device, a confirmation signal from the host device modulated with information confirming a successful authentication of the wearable device with the host device.

The method can be implemented in various ways to include one or more of the following features. The method can include responsive to receiving the confirmation signal, stopping, by the wearable device, transmission of the authentication data. The method includes communicating, using capacitive coupled signaling, with a point of sales (POS) terminal to process a transaction. Communicating, using capacitive coupled signaling, with a point of sales (POS) terminal to process a transaction can include sending authentication information to the POS terminal for verification. Communicating, using capacitive coupled signaling, with a point of sales (POS) terminal to process a transaction can include receiving, by the wearable device, confirmation from the POS terminal indicating a successful verification of the authentication information. The method can include receiving from the host device an authorization for the wearable device to spend up to a certain amount of money.

In another aspect, a mobile device for secure communications is described. The mobile device includes a capacitor sensor touch screen to perform capacitive sensing. The mobile device includes a fingerprint sensor to identify a fingerprint of an authorized user of the mobile device. The mobile device includes capacitive sensor transceiver circuitry in communication with the capacitive sensor touch screen to establish a device-to-device connection with another device via capacitive coupling through a body of a user touching the smartphone. Establishing a device-to-device connection includes transmitting a capacitive coupled signal generated by the capacitor sensor touch screen to the other device. The generated capacitive coupled signal is modulated with data.

The mobile device can be implemented in various ways to include one or more of the following features. The data can include authentication information. The authentication information can include encrypted ID and password. The capacitive sensor transceiver circuitry can transmit information to initiate a secured transaction with the other device via the device-to-device connection. The capacitive coupled signal generated by the capacitor sensor touch screen can include a fingerprint data identified by the fingerprint sensor.

In another aspect, a method performed by a mobile device to transmit a signal to another device through capacitive coupling is described. The method includes generating, by a capacitive sensor touch screen of the mobile device, a device-to-device connection initiation signal and a touch screen signal that represents user interface with the capacitive sensor touch screen. The method includes assigning the device-to-device communication signal and the touch screen signal to different time slots in a time division multiplexing scheme. The method includes transmitting, by capacitive sensor transceiver circuitry, the device-to-device communication signal to the other device using a body of a user of the mobile device as a capacitive coupled communication channel. The method includes receiving an acknowledgement to the transmitted device-to-device communication signal from the other device. The method includes responsive to the received acknowledgment signal, transmitting to the other device an acknowledgment back signal that is multiplexed in time with the touch screen signal.

The method can be implemented in various ways to include one or more of the following features. The method can include modulating information for device-to-device communication based on a frequency modulation protocol for device-to-device signaling between the mobile device and the other device using the body of a user of the mobile device as the capacitive coupled communication channel.

Notably, the device-to-device capacitive coupling communications can be implemented in ways that the device-to-device capacitive coupling communications function can share all or significant portion of the existing circuitry for the touch panels in smart phones and tablet computers. This use of the existing circuitry for the touch panels in smart phones and tablet computers allows the present device-to-device capacitive coupling communications to be added without significant increase in device real estate and complication of the device hardware. In comparison with some existing device-to-device communication methods (e.g., RF device to device communications under the Bluetooth and IR device to device communications), the present device-to-device capacitive coupling communications eliminate the need for completely separate hardware modules and can significantly reduce the power consumption of the device which is an important aspect of mobile electronic devices.

The following examples are provided for ad hoc device-to-device communications between two devices where one of the devices does not have a display function. Devices without a display function can be a sensor device in some applications.

For example, a method can be implemented for providing communications between a capacitor sensor touch screen device that includes a capacitor sensor touch screen with capacitor sensors and a capacitor sensor device that includes one or more capacitor sensors for capacitive sensing without a display function and is attached to or in proximity of a human body of a user. This method can include operating the capacitor sensor device without a display function to detect a device-to-device connection initiation signal from the capacitor sensor touch screen device via capacitive coupling through the human body of the user and, in response, to generate an acknowledgement to the device-to-device connection initiation signal; operating the capacitor sensor device without a display function to detect an acknowledgment back signal generated by the capacitor sensor touch screen device after receiving the acknowledgment from the capacitor sensor device without a display function; and subsequently operating the capacitor sensor device without a display function in a device-to-device communication mode to send data via the one or more capacitor sensors to the capacitor sensor touch screen device without a display function.

For another example, a method can be implemented for providing communications between (1) a capacitor sensor touch screen device that includes a capacitor sensor touch screen that includes capacitor sensors and provides a display function and (2) a capacitor sensor device that includes one or more capacitor sensors that detect or sense, based on capacitive sensing and without providing a display function, signals transmitted from the capacitor sensor touch screen of the capacitor sensor touch screen device. This method includes placing the capacitor sensor device without a display function in proximity of, or in contact with, a body part of a user to be in capacitive coupling with the body part; operating the capacitor sensor touch screen device to (1) control the capacitor sensor touch screen to provide touch-based user interfacing between the user and the capacitor sensor touch screen device, and (2) operate the same capacitor sensor touch screen to sense a device-to-device communication signal from the capacitor sensor device without a display function to allow device-to-device signaling between the capacitor sensor touch screen device and the capacitor sensor device without a display function via capacitive coupling through the human body of the user; operating the capacitor sensor touch screen device to initiate a device-to-device connection initiation signal and to multiplex the device-to-device connection initiation signal in time with a touch screen signal that provides touch-based user interfacing between touching of the capacitor sensor touch screen by the user and the capacitor sensor touch screen device so as to direct the multiplexed signal to the capacitor sensor touch screen; operating the capacitor sensor touch screen to receive an acknowledgement to the device-to-device connection initiation signal in a device-to-device communication signal from the capacitor sensor device without a display function; when the acknowledgment is detected, operating the capacitor sensor touch screen device to send the capacitor sensor device without a display function an acknowledgment back signal that is multiplexed in time with a touch screen signal to the capacitor sensor touch screen; and subsequently operating the capacitor sensor touch screen device to use one or more time slots in a touch screen signal that are not used for touch-based user interfacing between touching of the capacitor sensor touch screen by the user and the capacitor sensor touch screen device to communicate with the capacitor sensor device without a display function.

For yet another example, a method can be implemented for providing communications between a capacitor sensor touch screen device that includes a capacitor sensor touch screen with capacitor sensors and a capacitor sensor device that includes one or more capacitor sensors for capacitive sensing without a display function. This method includes placing the capacitor sensor device without a display function in proximity of, or in contact with, a body part of a user to be in capacitive coupling with the body part; operating the capacitor sensor touch screen device to (1) control the capacitor sensor touch screen to provide touch-based user interfacing between the user and the capacitor sensor touch screen device, and (2) operate the same capacitor sensor touch screen to initiate a device-to-device connection initiation signal and to multiplex the device-to-device connection initiation signal in time with a touch screen signal that provides touch-based user interfacing between touching of the capacitor sensor touch screen by the user and the capacitor sensor touch screen device so as to direct the multiplexed signal to the capacitor sensor touch screen; operating the capacitor sensor device without a display function to detect the device-to-device connection initiation signal via capacitive coupling through the human body of the user and, in response, to generate an acknowledgement to the device-to-device connection initiation signal. This method operates the capacitor sensor touch screen of the capacitor sensor touch screen device to receive the acknowledgement from the capacitor sensor device without a display function. In addition, this method includes, when the acknowledgment is detected, operating the capacitor sensor touch screen device to send the capacitor sensor device without a display function an acknowledgment back signal that is multiplexed in time with a touch screen signal to the capacitor sensor touch screen; operating the capacitor sensor device without a display function to detect the acknowledgment back signal from the capacitor sensor touch screen device and, in response, to set the capacitor sensor device into a device-to-device communication mode to send data to the capacitor sensor touch screen device; and subsequently operating the capacitor sensor touch screen device to use one or more time slots in a touch screen signal that are not used for touch-based user interfacing between touching of the capacitor sensor touch screen by the user and the capacitor sensor touch screen device to communicate with the capacitor sensor device, including receiving the data from the capacitor sensor device without a display function.

In some embodiments, device-to-device communication port 114 can be implemented using other wireless technologies including radio frequency identification (RFID) and NFC technology. When using NFC technology, the device-to-device communication port 114 can be implemented as an RF NFC port, for example.

The credit card type device 100 can also include an output device 116, such as a display. Examples of a display device can include a simple LED indicator or a LCD display. Such a display can be used to display information associated with authentication and/or the status of a financial transaction (e.g., verified, retry or denied, transaction amount, transaction confirmation, financial data, etc.). The credit card type device 100 can have a size and an aspect ratio similar to a regular credit card.

The credit card type device 100 may be associated with or pre-programmed with a predetermined monetary value (i.e. money balance), and can be used as a cash card. Also, the credit card type device 100 can be operated as a gift card associated with the predetermined value and a particular business. In addition, a logo associated with the particular business can be displayed on the output device 116. The balance information and other financial information associated with the balance may be stored in the memory 110 and can be displayed on the output device 116. Each transaction on the card device may be tracked. The balance of the credit card type device 100 may be increased, decreased, and erased/reset. For example, parents can configure such a card device to have a specific balance as an allowance and give the card to a child. The parents can then track the card use for each transaction made on the card device. The balance on the card device may be changed by the parents. To program the card device (e.g., increase, decrease, and erase the balance), a smartphone equipped with a NFC communication port may be used to communicate with the credit card type device 100 to configure the credit card type device 100, such as the balance, associated business, expiration date, expire the card etc.

Then the balance/value of the credit card type device 100 reaches zero or the expiration date passes, the credit card type device 100 can be reset automatically to operate as a generic gift card. Then the balance can be replenished. Also, the generic gift card 100 can be associated with a different business for use at that business only. In addition, the credit card type device 100 can be reset and reprogrammed at any time independent of the balance or the expiration date.

Figure 2:
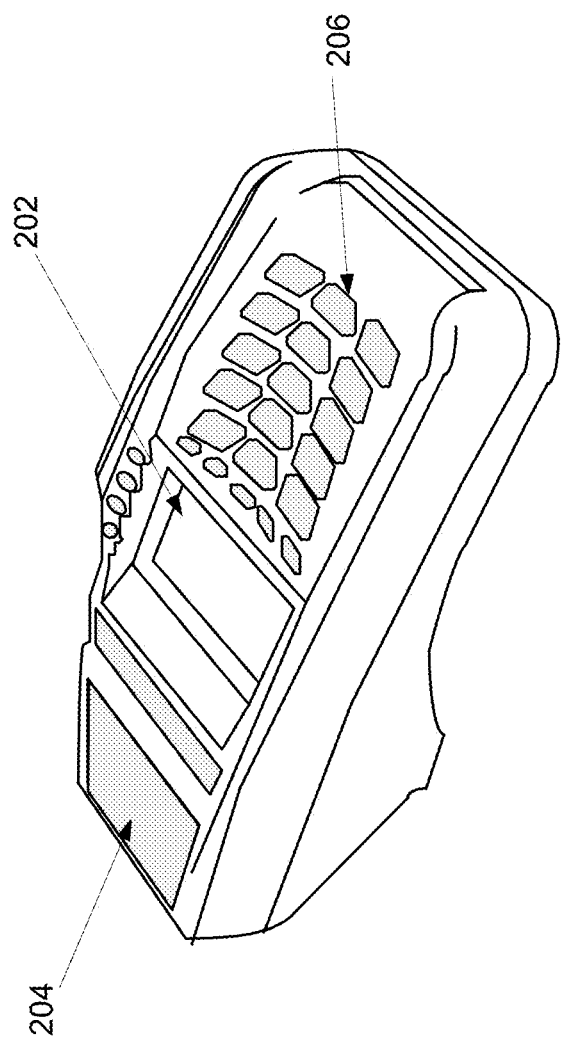
FIG. 2 shows an example of a transaction terminal of a disclosed financial transaction system.

FIG. 2 shows an example of a transaction terminal 200 for use in conducting a financial transaction. As shown in FIG. 2, transaction terminal 200 may include an output device 202, such as a display for displaying information associated with initiating and completing a financial transaction, including status of transactions, the transaction amount, etc. The transaction terminal 200 can also include a device-to-device communication port 204, such as an NFC port 204 in the form of a capacitive-coupling NFC port. In other embodiments, the device-to-device communication port 204 can also be implemented as an RF NFC port. In some embodiments, the device-to-device communication 204 of transaction terminal 200 is configured as a capacitive transceiver that includes a transmitter (TX) for sending a signal via capacitive coupling port 204 to a credit card type device such as device 100, and a receiver (RX) for receiving a signal via capacitive coupling NFC port 204 from a credit card type device such as device 100. The transaction terminal 200 can include a data input device 206, such as a keypad, a touch screen or other form of an user interface for receiving user inputs such as the transaction amount, passcode, etc. The transaction terminal 200 additionally includes a wired or wireless communication port (not shown) for connecting to the Internet to send and receive secure data to and from a remote transaction server of the financial institution associated with a credit card type device communicating with the transaction terminal 200. The communication of the transaction terminal over the Internet is typically secured through an encryption mechanism.

Figure 3:
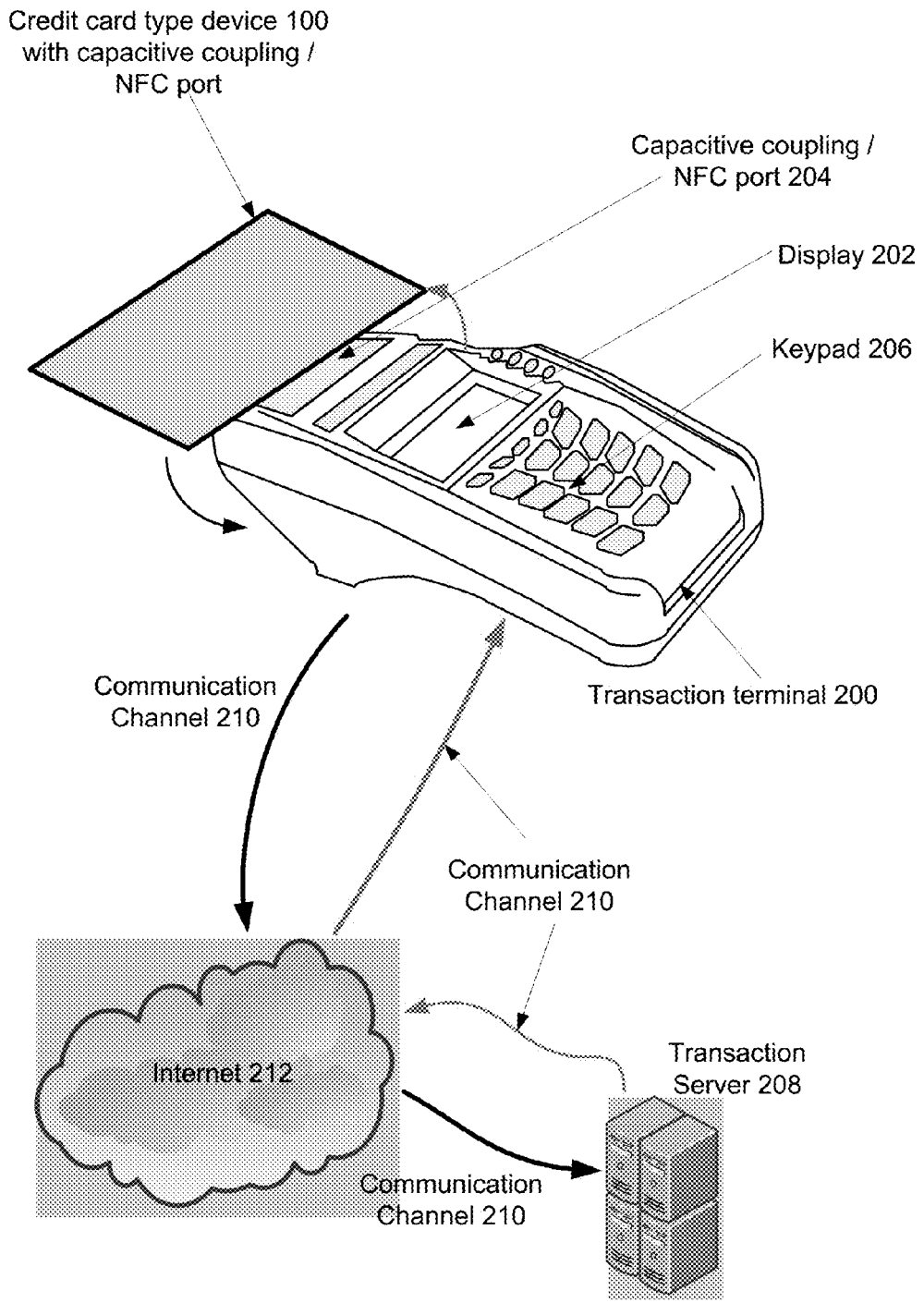
FIG. 3 illustrates an exemplary operation of a disclosed financial transaction system including a credit card type device and a transaction terminal in accordance with some embodiments described herein.

FIG. 3 illustrates an exemplary operation of the disclosed financial transaction system including the credit card type device 100 and the transaction terminal 200 in accordance with some embodiments described herein. When a credit card type device 100 is within a communication range of a transaction terminal 200, a device-to-device communication channel can be established between the two devices. Using the established device-to-device communication channel, information associated with initiating a financial transaction, such as paying for a merchandise or a service offered by the owner of the transaction terminal can be exchanged. Information associated with initiating a financial transaction can include a request to initiate financial transaction, a transaction amount, an acknowledgement in response to the request to initiate the financial transaction, etc.

To use the credit card type device 100 for the financial transaction, access to the card type device 100 can be authenticated using authentication information received through the authentication mechanism. Examples include a fingerprint detected through a fingerprint detector, or a passcode received through a passcode device. The received authentication information is compared against stored information associated with an authorized user or owner of the credit card type device 100. When the authentication information is verified to match the stored information associated with the authorized user or owner, the access is authenticated. In some implementations, the output device of the credit card type device 100 indicates that the verification is successful and the credit card type device is ready to be used for the financial transaction. Through the establish device-to-device communication, the credit card device 100 exchanges transaction information with the terminal 200 through an NFC channel, for example. The transaction information can include credit information of the owner or authorized user of the credit card type device 100, for example.

The transaction terminal 200 can send the transaction data to a remote transaction server 208 of a financial institution associated with the credit card type device, where the authorized user or owner has an account through a secured communication channel 210 over the Internet 212. Through this secure communication, the transaction terminal 200 verifies the authorized owner's or user's financial data with transaction server 208, which sends back confirmation data to the transaction terminal 200 through the secured communication channel 210 over the Internet 212. The transaction terminal 200 sends the confirmation through the device-to-device NFC channel back to the user's credit card type device 100.

In some implementations, the function of a credit card type device may be implemented on a smartphone equipped with a capacitive touch screen. The capacitive touch screen of the smartphone can be used as the above-described capacitive-coupled NFC channel for communicating with a transaction terminal. A dedicated application on the smartphone can be used to control the financial transactions as a credit card type device function, such as scanning the fingerprint, communicating with the transaction terminal of the user's data etc. The smartphone may also include a fingerprint scanner to verify the access authentication.

In some implementations, the various functions of the above-described transaction terminal may be implemented on a smartphone equipped with a capacitive touch screen. In these implementations, the capacitive touch screen of the smartphone can be used as the above-described capacitive-coupling NFC port for communicating with the credit card type device. A dedicated application on the smartphone can be used to implement the functions of a transaction terminal, i.e., communicating with the credit card type device through the capacitive touch screen and communicating with a remote server of the financial institution through the Internet.

In some implementations, a credit card type device such as credit card type device 100 can be configured by a smartphone equipped with an NFC port (e.g., a capacitive coupling NFC port or RF NFC port), wherein the smartphone has a special application program for accessing the card owner's financial information. For example, once the credit card type device is authenticated, and linked with the smartphone through an established NFC channel, the smartphone application can be used to set up a new spending allowance allowed by the credit card type device, and set up an expiration date after which the allowance on the card will expire. The smartphone can transfer the above information to the credit card type device through the NFC channel. For example, parents can configure such a card device with a specific balance by using a smartphone equipped with an NFC port, and give the card to a child as allowance. The parents can then track the card use for each transaction on the card device.

The smartphone application can also access the information stored on the credit card type device, such as the balance and the expiration date. The smartphone program can also reset the credit card type device through a special command. Once the credit card type device is reset, all the remaining balance on the card device is expired and the authentication information is removed. The owner of the credit card type device can reprogram the card device with a new passcode, or a new fingerprint authentication. The credit card type device may be configured with a money return function such that if the card is lost, the balance on the card is refunded to the owner of the card (such as back to the owner's bank account) when the card balance has expired.

In some embodiments, the credit card type device can be configured as a business-specific gift card. This business-specific gift card can be issued and sold by a specific business such as a coffee chain or a retail store, with a specific balance on the card for the exclusive purchase of the products of the business. In particular, the business can sell the credit card type device only at its associated merchandise purchase value while the cost of the generic credit card type device is subsidized by the business. The business can put its logo on the credit card type device as an advertisement of the business. This business-specific gift card can become a generic credit card type device once its original balance goes down to zero. At this point, the generic credit card type device can be reprogrammed with a new balance by the owner of the card device. In some embodiments, this business-specific gift card has a reset function to erase its balance, thereby becoming a generic card before the balance goes to zero or the expiration date. A generic card can be reprogrammed with a new balance, wherein the new balance can be associated with an expiration date at which time the card will lose all its value. If the card is lost, the balance can be returned to the owner's bank account after the expiration date is reached.

In an example implementation, a single user can have multiple credit card type devices. The user can use a smartphone application to configure different amounts of money allowed to each of the multiple cards and subsequently give these cards to others as gift cards. A receiver of this type of gift card can then configure the card with his/her authentication information by entering a new passcode or setting up a fingerprint pattern, and subsequently start using the card for financial transactions. When that gift card has expired, the card can be reconfigured as a personal credit card type device by the current owner of the card.

In some implementations, a single credit card type device 100 can be associated with multiple businesses and/or accounts with corresponding values or balances. Access to each account can be separately authenticated. The user can select which account to use during a particular transaction. In some implementations, one transaction can be paid through multiple accounts. By associating multiple accounts on a single credit card type device 100, the authorized user or owner can carry one device. In addition, a value remaining in balance in one account can be transferred to another account.

Figure 4:
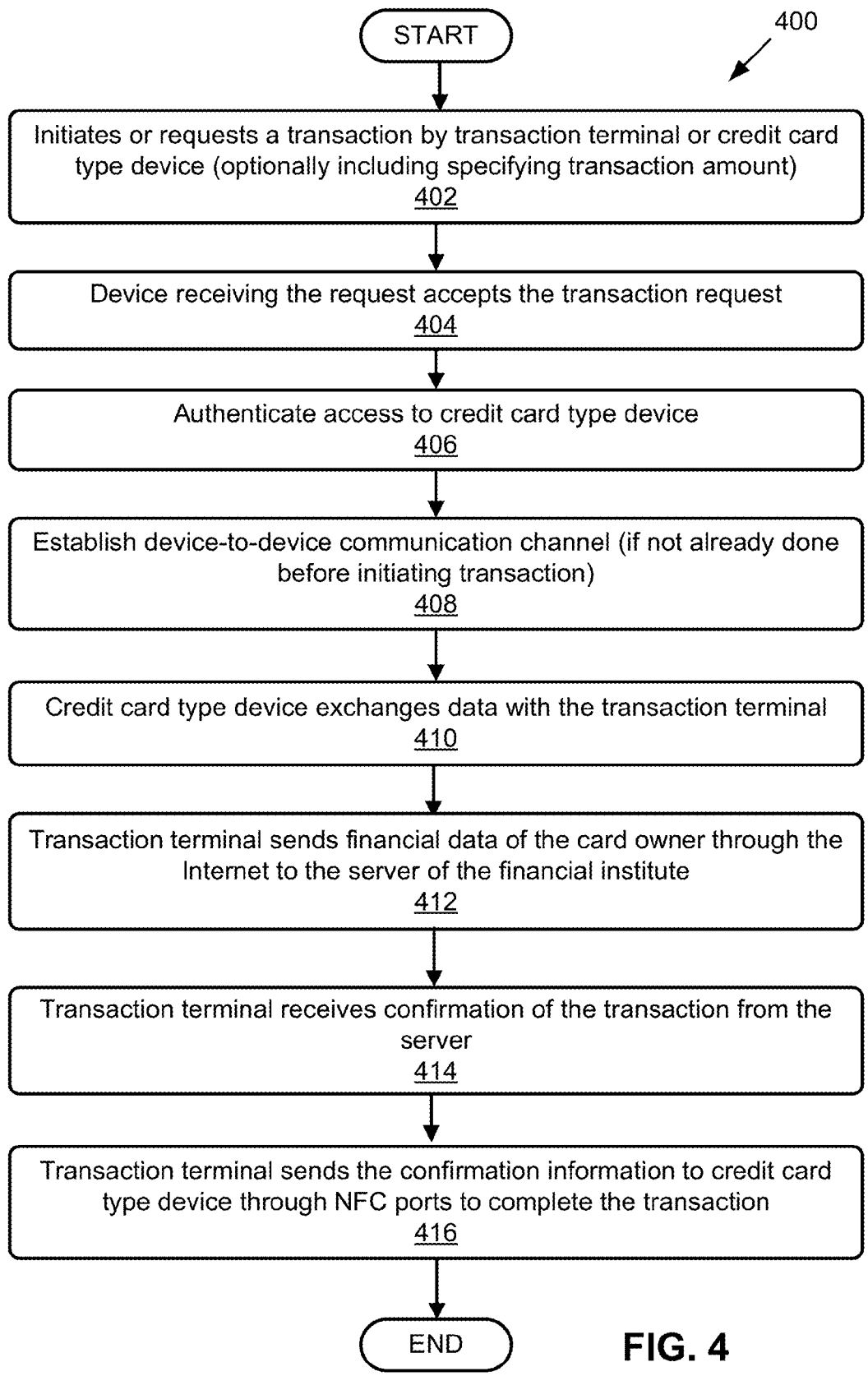
FIG. 4 is a flowchart illustrating an exemplary process of performing a financial transaction using a financial transaction system including a credit card type device and a transaction terminal.
Figure 5A:
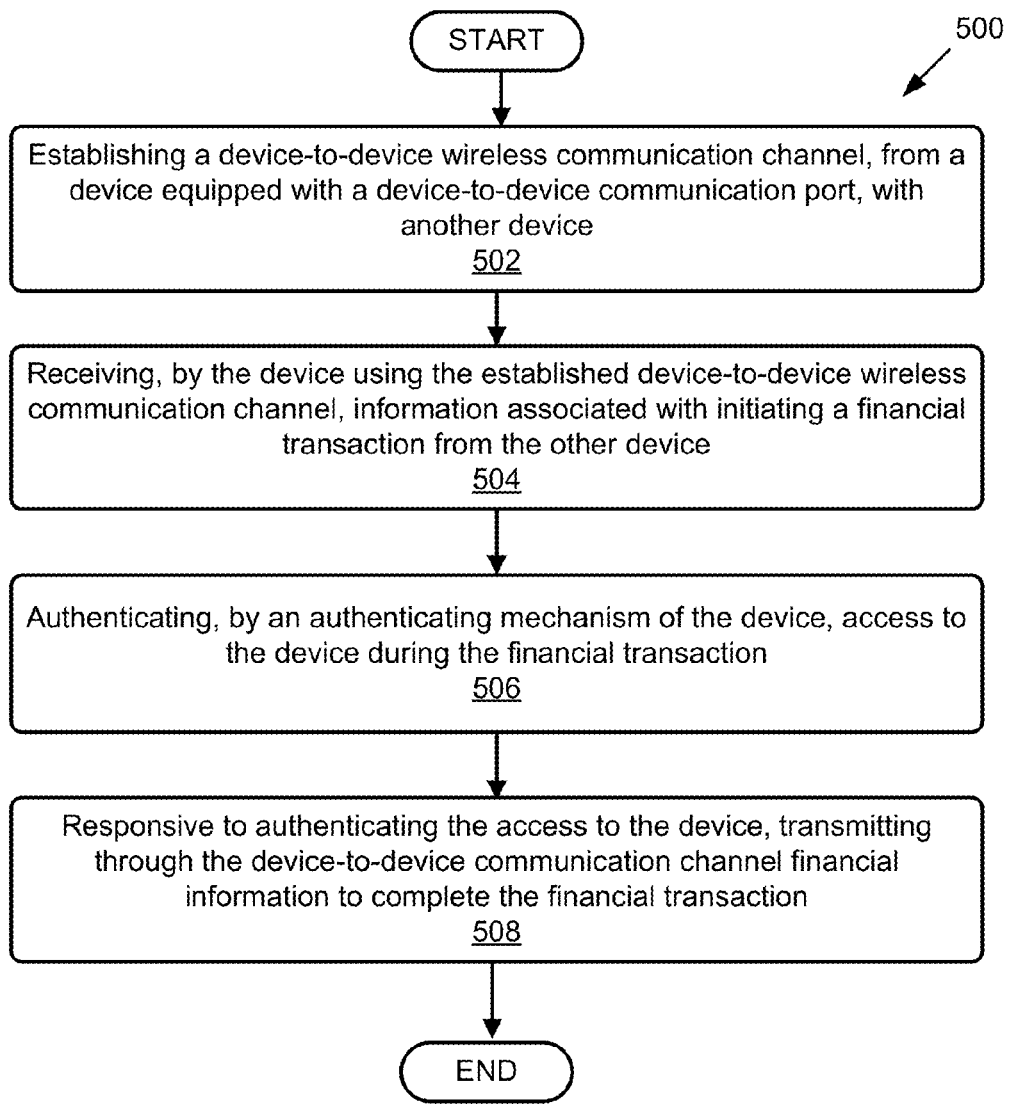
FIGS. 5A, 5B, 5C, and 5D are flowcharts illustrating an exemplary process performed by a credit card type device during a financial transaction with another device.
Figure 5B:
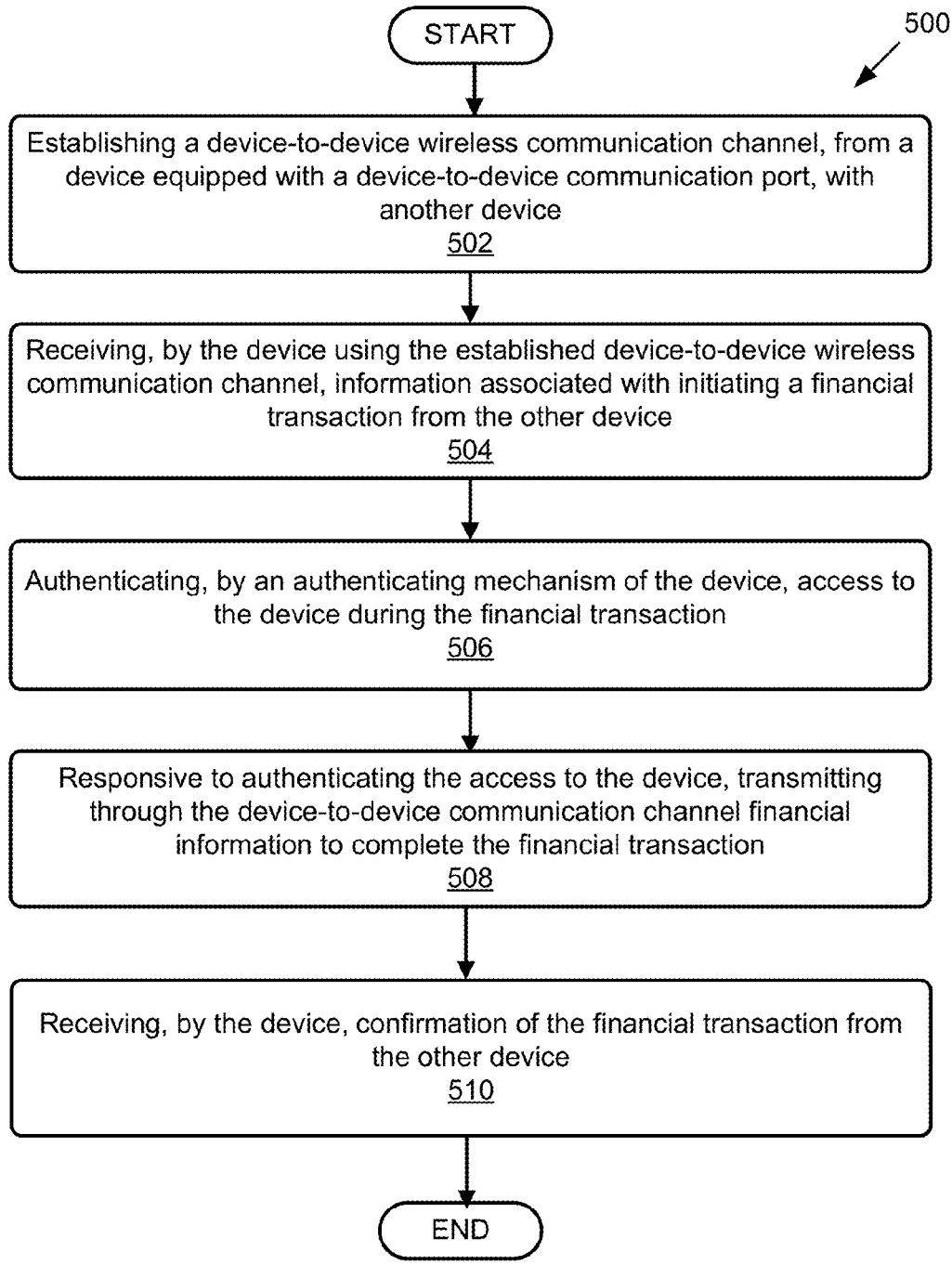
Figure 5C:
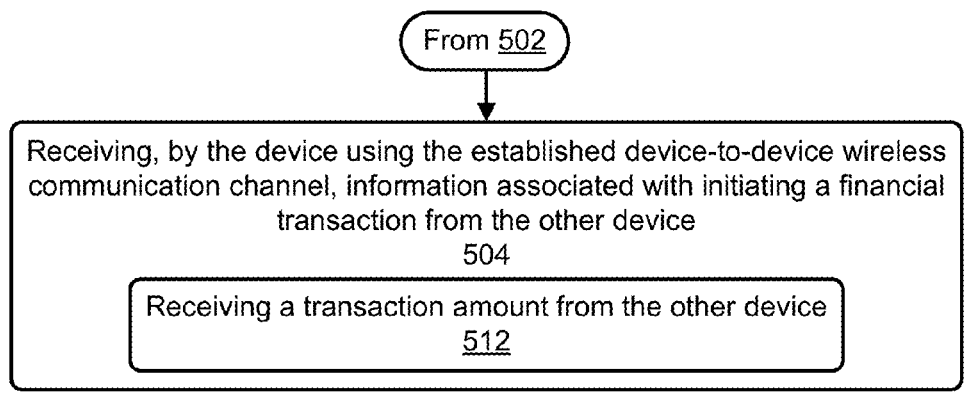
Figure 5D:
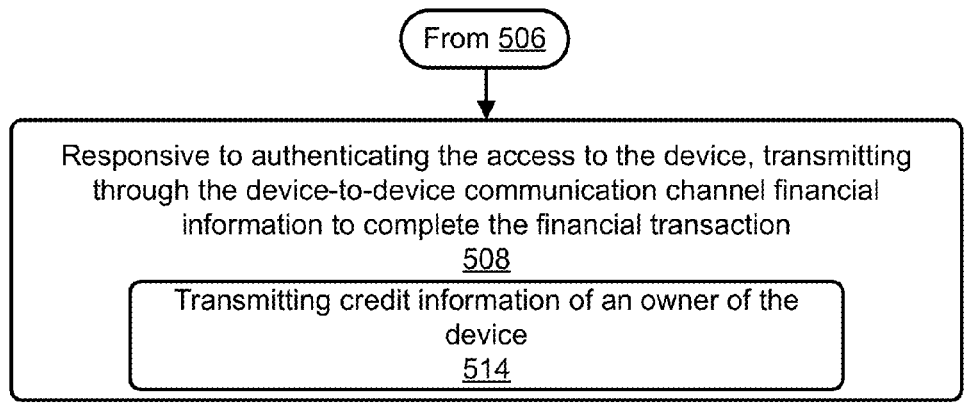
Figure 6A:
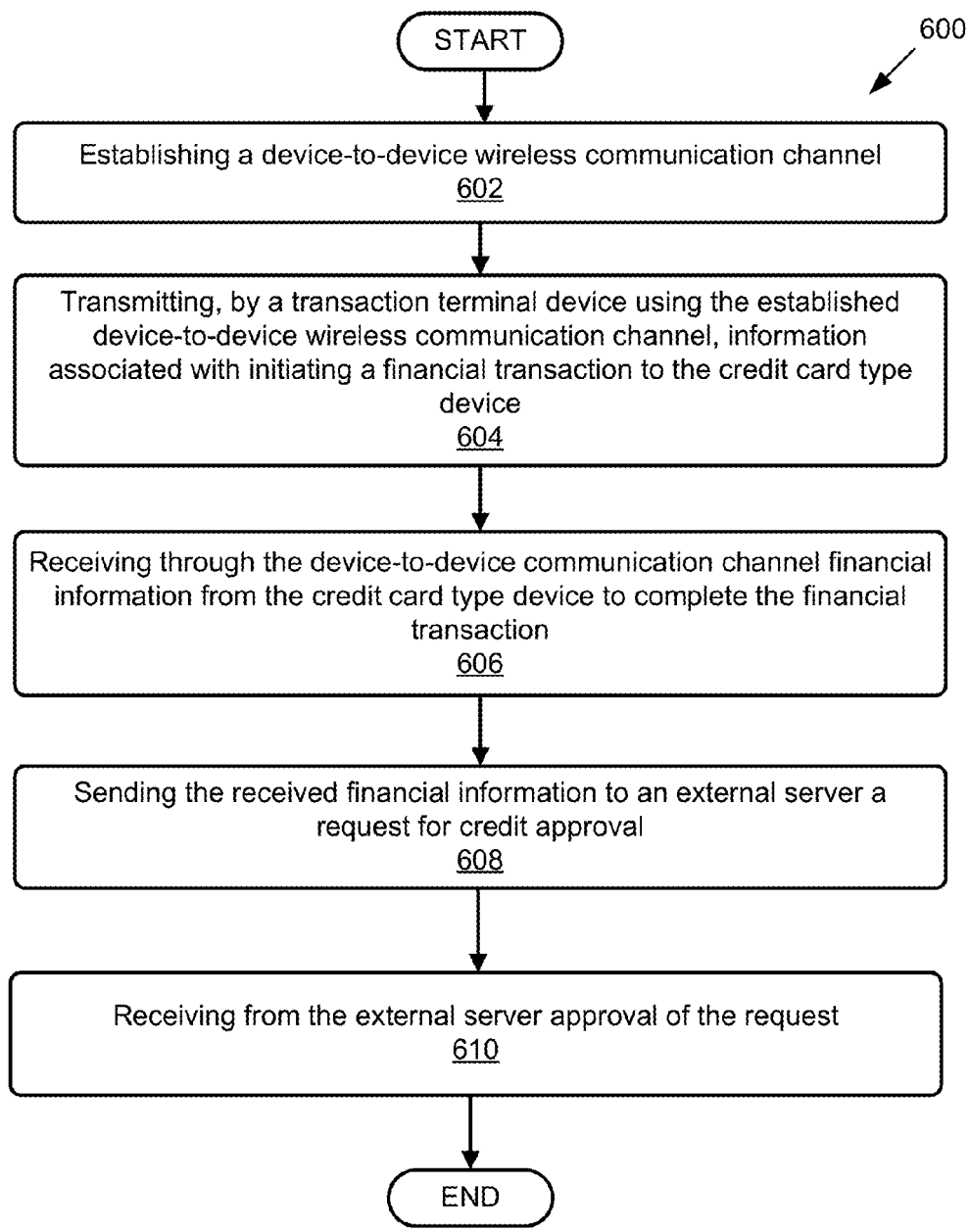
FIGS. 6A, 6B, 6C, and 6D are flowcharts illustrating an exemplary process performed by a transaction terminal device during a financial transaction with a credit card type device.
Figure 6B:
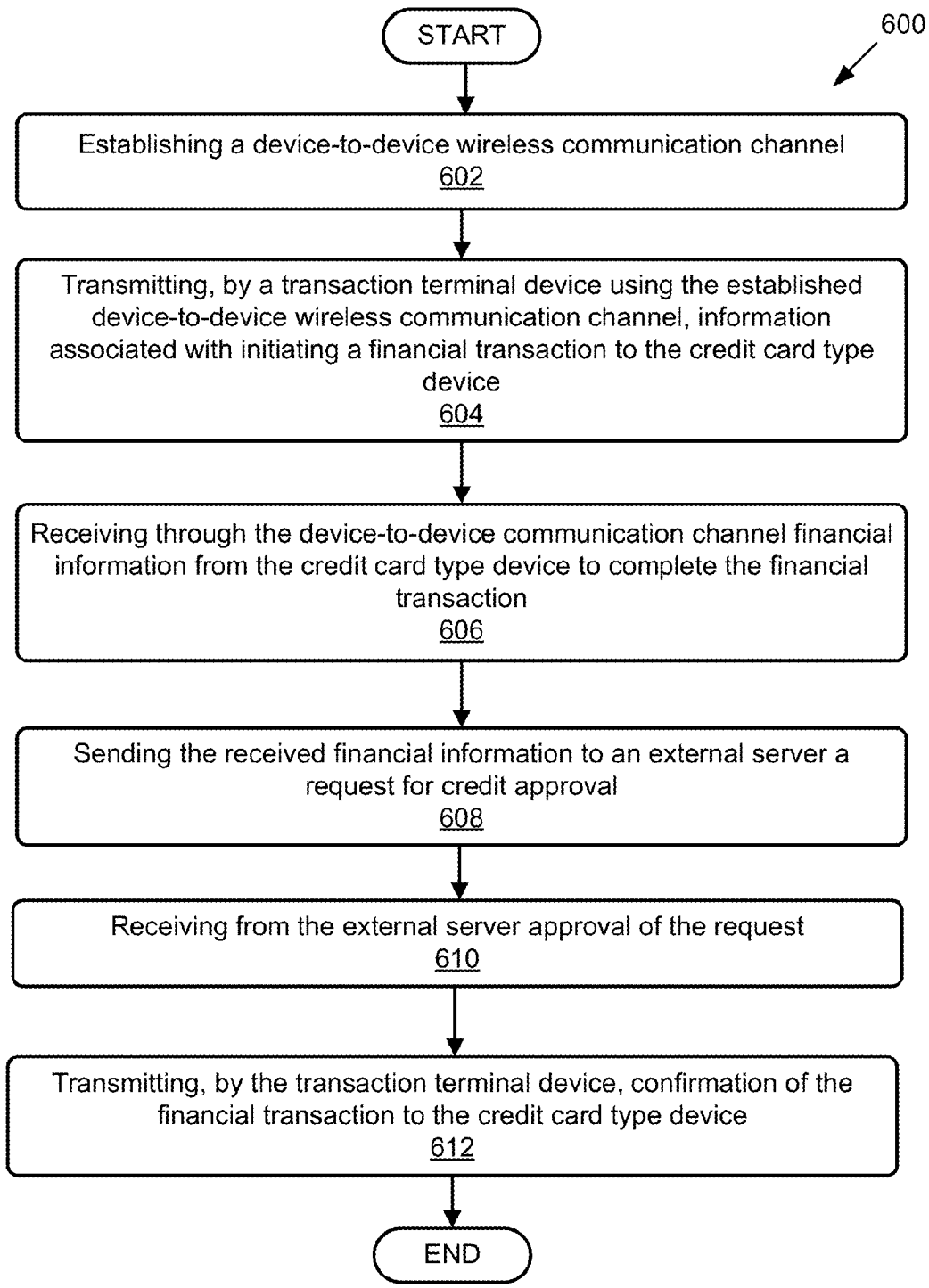
Figure 6C:
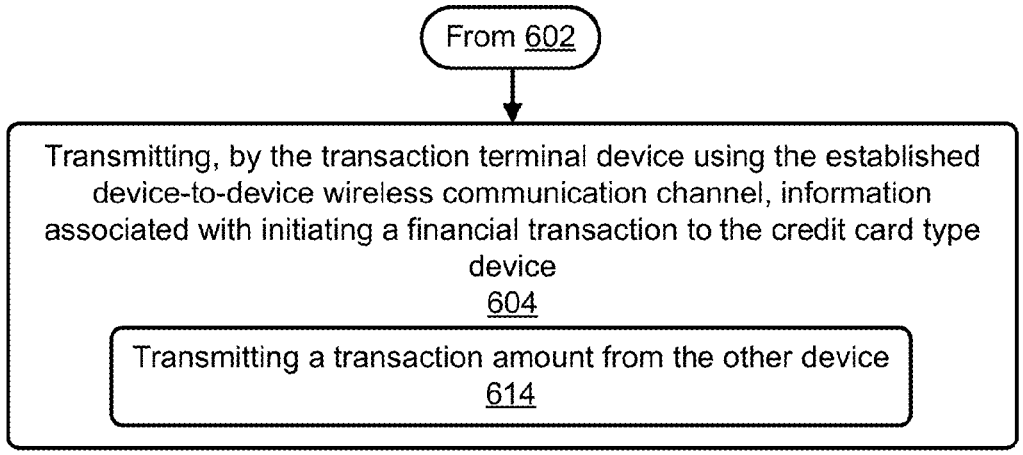
Figure 6D:
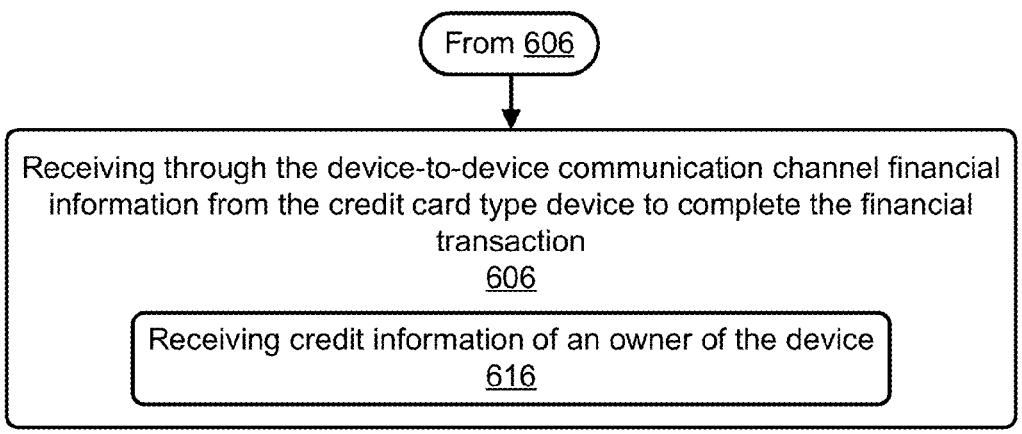

FIG. 4 presents a flowchart illustrating a process 400 of performing a financial transaction using a financial transaction system including a credit card type device and a transaction terminal in accordance with some embodiments described herein. To begin a new financial transaction, a transaction amount can be received through a transaction terminal (402). The transaction amount can received manually through a keypad or wirelessly from another device as a part of initiating the transaction. Also, the transaction amount can be received automatically when a product is scanned (e.g., using a barcode reader or other mechanism). When receiving the transaction amount through another device, the transaction amount can be received through the cloud in response to a selection made for purchasing a product or service from the other device through a transaction application resident on the other device or in the cloud. Thus, the initiation of the financial transaction can be initiated by either the credit card type device 100 or the transaction terminal 200.

Depending on the device initiating or requesting the financial transaction, the receiving device accepts the initiation of the transaction (404). Access to the credit card type device authenticated (406), for example, using a passcode or a fingerprint scan or both. When the credit card type device is in communication range of the transaction terminal, a device-to-device communication channel between the credit card type device 100 and the transaction terminal device can be established (408). For example, the device-to-device communication channel can be established between the NFC port of the credit card type device and the NFC port of the transaction terminal (through either capacitive-coupling or RF coupling). Through the establish device-to-device communication channel, the credit card type device exchanges data with the transaction terminal including the credit card owner's credit information (410). The transaction terminal sends the financial data of the card owner through the Internet to the server of the financial institution (412). The transaction terminal receives confirmation of the transaction from the server of the financial institution responsive to transmitting the card owner's financial data, which is verified by the server of the financial institute (414). Finally, the transaction terminal receives the confirmation data from the server, and sends the confirmation information to the credit card type device through the NFC ports to complete the transaction (414).

FIGS. 5A, 5B, 5C, and 5D are flowcharts illustrating an exemplary process 500 performed by a credit card type device during a financial transaction with another device. The process 500 for performing device-to-device communication includes establishing a device-to-device wireless communication channel, from a device equipped with a device-to-device communication port, with another device (502). The process 500 includes receiving, by the device using the established device-to-device wireless communication channel, information associated with initiating a financial transaction from the other device (504). The process 500 includes authenticating, by an authenticating mechanism of the device, access to the device during the financial transaction (506). The process 500 includes responsive to authenticating the access to the device, transmitting through the device-to-device communication channel financial information to complete the financial transaction (508).

The process can be implemented in various ways to include one or more of the following features. The process can include receiving, by the device, confirmation of the financial transaction from the other device (510). Receiving information associated with initiating a financial transaction from the other device can include receiving a transaction amount (512). The financial data can include credit information of an owner of the device (514). Authenticating access to the device can include receiving a passcode through the authentication mechanism, detecting a fingerprint by the authentication mechanism, or both.

FIGS. 6A, 6B, 6C, and 6D are flowcharts illustrating an exemplary process 600 performed by a transaction terminal device during a financial transaction with a credit card type device. The process 600 for performing device-to-device communication includes establishing a device-to-device wireless communication channel, from the transaction terminal device equipped with a device-to-device communication port, with the credit card type device (602). The process 600 includes transmitting, by the transaction terminal device using the established device-to-device wireless communication channel, information associated with initiating a financial transaction from the other device (604). The process 600 includes receiving through the device-to-device communication channel financial information from the credit card type device to complete the financial transaction (606). The process 600 includes sending the received financial information to an external server a request for credit approval (608). The process 600 includes receiving from the external server approval of the request (610).

The process can be implemented in various ways to include one or more of the following features. The process can include transmitting, by the transaction terminal device, confirmation of the financial transaction to the credit card type device (612). Transmitting information associated with initiating a financial transaction from the other device can include receiving a transaction amount (614). The financial data can include credit information of an owner of the device (616).

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Only a few embodiments are described. Other embodiments and their variations and enhancements can be made based on what is described and illustrated.

What is claimed is:

1. A credit card type device, comprising:
a device-to-device communication port to wirelessly communicate with another device to complete a financial transaction, wherein the device-to-device communication port includes a capacitive-coupling port that capacitively couples between the credit card type device and the other device when placed in a close proximity suitable for capacitive coupling to exchange information between the credit card type device and the other device;
an authentication mechanism to authenticate access to the credit card type device for the initiated financial transaction;
controller circuitry to control operations of the device-to-device communication port and the authentication mechanism; and
an output device to display information associated with the authentication and the financial transaction.

2. The credit card type device of claim 1, wherein the device-to-device communication port further includes, in addition to the capacitive-coupling port, a radio frequency (RF)-coupling near-field communication (NFC) port to provide RF NFC communications.

3. The credit card type device of claim 1, wherein the authentication mechanism includes a passcode authentication mechanism, a fingerprint detection mechanism, or both the passcode authentication mechanism and the fingerprint detection mechanism.

4. The credit card type device of claim 3, wherein the passcode authentication mechanism includes buttons or a keypad.

5. The credit card type device of claim 3, wherein the fingerprint detection mechanism includes a fingerprint scanner.

6. The credit card type device of claim 1, wherein the control circuitry includes:
a processor; and
a memory.

7. The credit card type device of claim 1, wherein the credit card type device is to communicate with a host device to receive information to configure the credit card device.

8. The credit card type device of claim 1, wherein the credit card type device is configured as a gift card associated with a particular business and having a predetermined value.

9. The credit card type device of claim 8, wherein the output device is configured to display a logo of the particular business.

10. The credit card type device of claim 8, wherein the credit card type device is configured to temporarily associate with the particular business until the predetermined value reaches zero or until an expiration date is reached.

11. The credit card type device of claim 10, wherein the credit card type device is reusable as a generic gift card when the temporary association with the particular business ends.

12. The credit card type device of claim 8, wherein the gift card includes a reset function to erase the predetermined value and to disassociate with the particular business to operate a generic gift card applicable for multiple businesses.

13. The credit card type device of claim 12, wherein when operating as the generic gift card, the credit card type device is reprogrammable with a new value associated with a new expiration date.

14. The credit card type device of claim 13, wherein the reprogrammed new value of the generic gift card is refundable to an owner of the generic gift card after the new expiration date is reached.

15. The credit card type device of claim 1, including a battery.

16. The credit card type device of claim 1, wherein the credit card type device is implemented on a smartphone equipped with a capacitive touch screen.

17. The credit card type device of claim 1, wherein the device-to-device communication port capacitively couples information to a wearable device via a living body corresponding to a wearer of the wearable device.

18. A method for performing device-to-device communication, comprising:
   establishing a device-to-device wireless communication channel between a device equipped with a device-to-device communication port and another device, wherein the device-to-device communication channel capacitively couples information between the device and the other device;
   receiving, by the device using the established device-to-device wireless communication channel, information associated with initiating a financial transaction from the other device;
   authenticating, by an authenticating mechanism of the device, access to the device during the financial transaction; and
   responsive to authenticating the access to the device, transmitting through the device-to-device communication channel financial information to complete the financial transaction.

19. The method of claim 18, further comprising:
   receiving, by the device, confirmation of the financial transaction from the other device.

20. The method of claim 18, wherein receiving information associated with initiating a financial transaction from the other device includes receiving a transaction amount.

21. The method of claim 18, wherein the financial data includes credit information of an owner of the device.

22. The method of claim 18, wherein authenticating the access to the device includes receiving a passcode through the authentication mechanism, detecting a fingerprint by the authentication mechanism, or both.

* * * * *